June 16, 1931. R. G. DAVIS ET AL 1,810,871
ACTIVATION OF CARBON
Filed Sept. 17, 1928  2 Sheets-Sheet 2
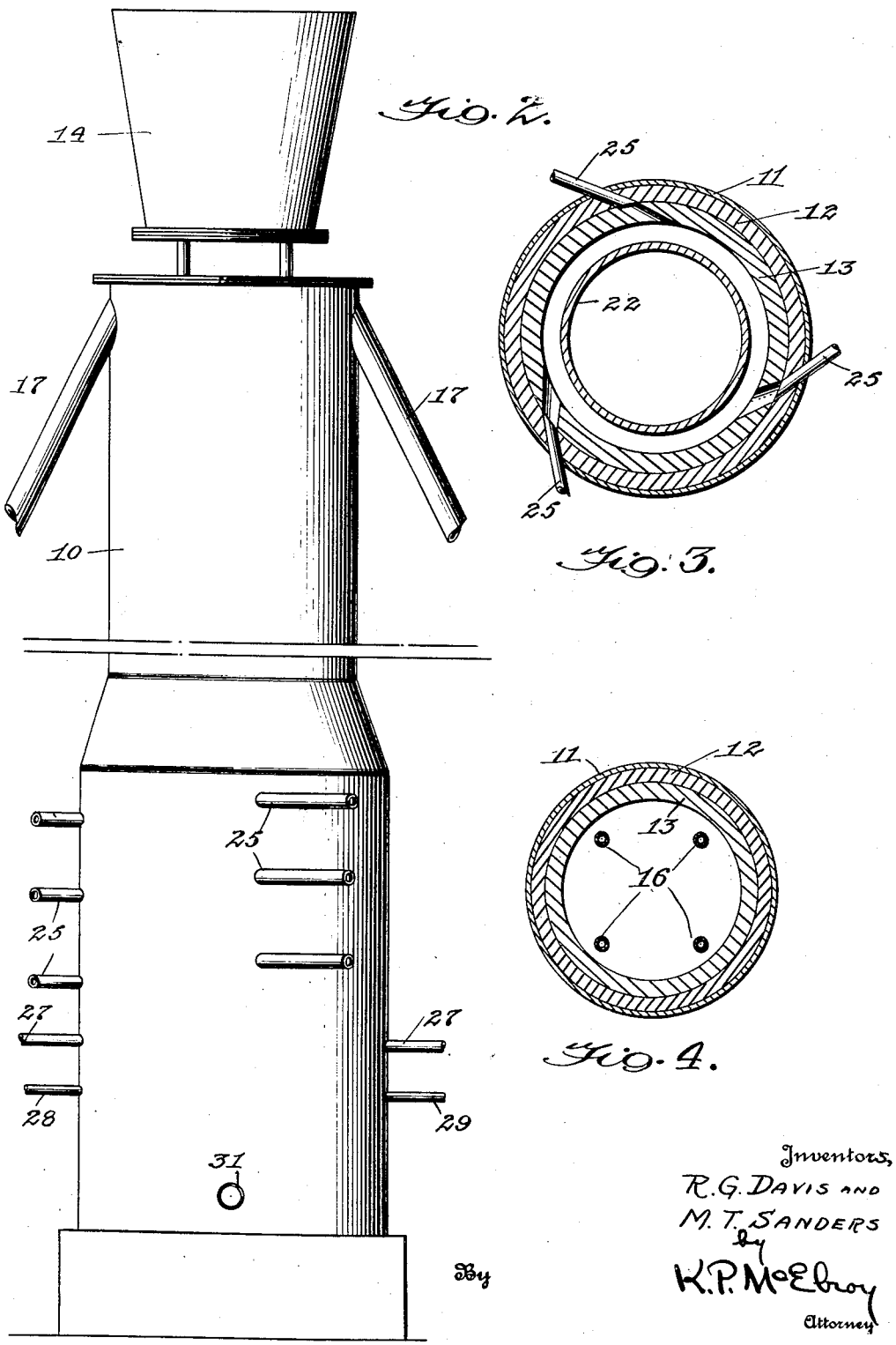

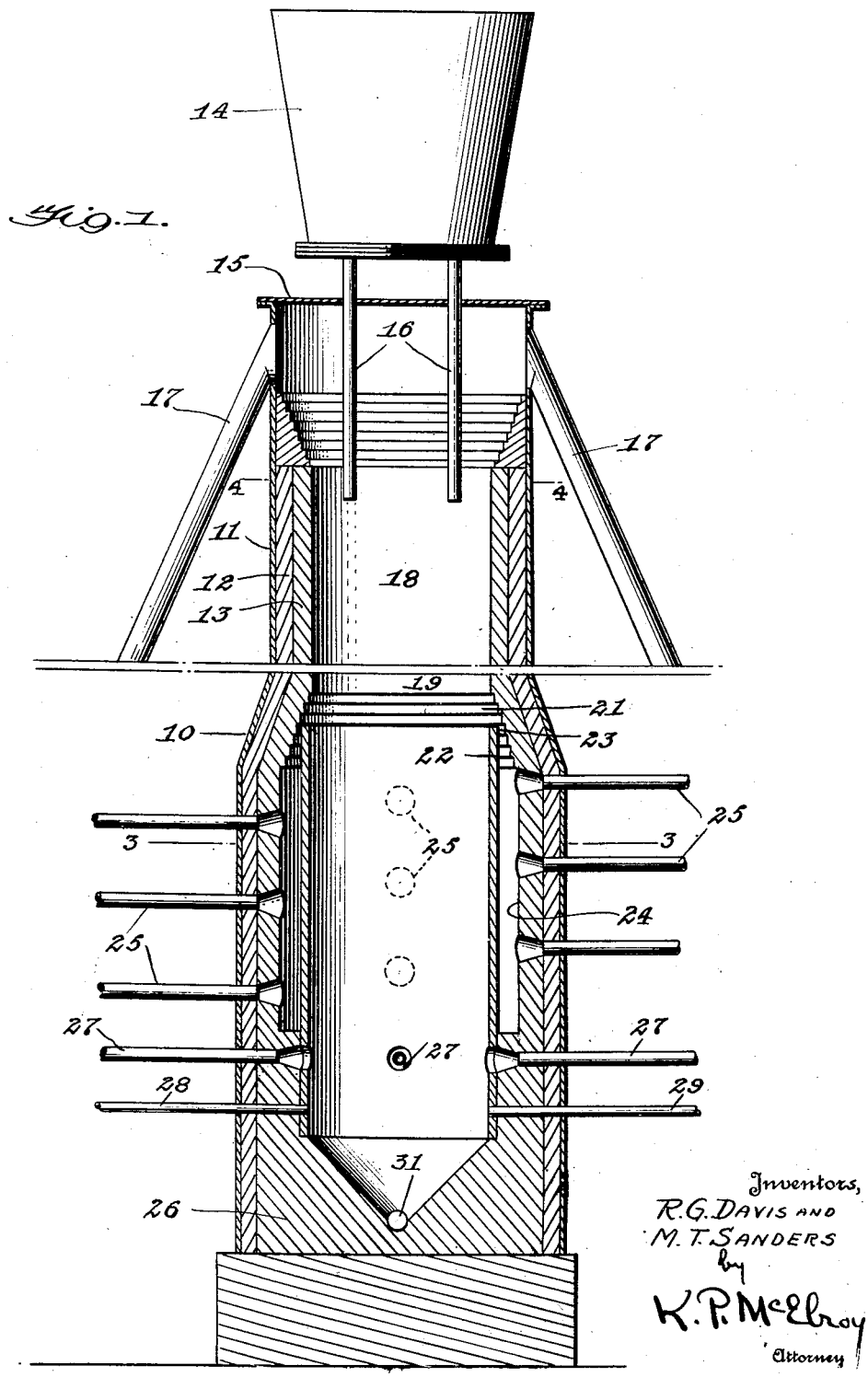

Patented June 16, 1931

1,810,871

UNITED STATES PATENT OFFICE

RAYMOND G. DAVIS, OF MARSHALL, TEXAS, AND MARSHALL T. SANDERS, OF WILMINGTON, DELAWARE, ASSIGNORS TO DARCO CORPORATION, OF WILMINGTON, DELAWARE, A CORPORATION OF DELAWARE

ACTIVATION OF CARBON

Application filed September 17, 1928. Serial No. 306,375.

This invention relates to the activation of carbon; and it comprises a method of activating carbon with methodical utilization of heat and with production of carbon of high quality wherein moving particles of carbon to be activated are preheated to a temperature not exceeding 800° C. by contact with cooled products of combustion and are therafter activated by exposure to the action of steam at a temperature of 850° C. or higher, the temperature necessary in this action being derived from flame gases which are thereby dropped in temperature or cooled to be used for the preheating of the carbon; and it also comprises certain apparatus useful in the performance of the described process, comprising means for forming products of combustion, a vertical heating shell in the path of the hot products of combustion, means for removing products of combustion thereby cooled, means for introducing steam into the shell, means for passing carbon through and in contact with the cooled products of combustion and thence through said shell and means for collecting the treated carbon; all as more fully hereinafter set forth and as claimed.

Activated carbon is a term used for the decolorizing carbon employed in purifying liquids and for the carbon used in adsorbing gases and vapors. Commercial varieties are produced from a variety of raw materials ranging from wood charcoal to lignite. In all the preparations the grain or granule is of a pervious nature to add internal surface to external and increase the adsorbing effect. Decolorizing carbons are largely used in purifying sugar solutions, oils and the like. Sometimes activated carbons are used as fine powders and sometimes in a more coarsely granular condition. Some commercial preparations will just pass a 10-mesh screen while others pass a 40-mesh screen. Many preparations are much finer than this and contain substantial amounts of material which will pass a 200-mesh screen. The particular raw material to be used in making activated carbon depends somewhat upon the subsequent use of the carbon and the amount of porosity or internal surface which is required. For many purposes lignites give particularly effective material.

In current methods of activation, carbon is submitted to a limited oxidation by being heated to 800° C. or above in the absence of air and in the presence of products of combustion or steam as "mild oxidants". Sometimes heating is in externally heated retorts with an internal flow of activating gas and sometimes heating is by direct contact with hot flame gases or products of combustion. In either event, the action is supposed to be that of burning or removing adsorbed gases and tarry matter; "cleaning out the pores". Either $CO_2$ or $H_2O$ vapor at proper temperatures will exercise this "cleaning out" action since both will oxidize carbon with production of CO. Specifically however their action is different. In both cases the action is markedly endothermic, necessitating an ample supply of heat and tending to be self-limiting because of the cooling due to reaction.

In the art steam and products of combustion are assumed to be equivalent and interchangeable and are generally so recited in the patents and literature. As a matter of fact, products of combustion contain steam; they are usually mixtures of steam ($H_2O$ vapor) and $CO_2$ in varying proportions with diluent nitrogen. Flame gases from a natural gas flame carry a greater volume of steam than of $CO_2$; and oil gas flames carry as much $H_2O$ as $CO_2$. Producer gas flame gases are poorer in $H_2O$ but it is never entirely absent.

We have found this presumed equivalency does not exist, the action of $CO_2$ being different from that of $H_2O$ and that of mixtures of the two being different from that of either. The present invention is based on this discovery. The action of $CO_2$ alone is more energetic than that of $H_2O$; and the rate of action increases more quickly with an increase in temperature. There is but little action by $CO_2$ on C at temperatures below 750° C., but at temperatures between 750° and 850° its action when present in ample supply may become quite destructive.

Temperatures above 850° C. may result in material impairment of activity.

In the simultaneous action of $CO_2$ and $H_2O$, as in activating with the aid of flame gases, the actions seem to be different again; but they are not more desirable.

We have found that much the best results are obtained by the use of steam alone as the activating gas and that in so doing temperatures may be pushed above 850° C. without waste of carbon and with considerable improvement in its activity. Excessive oxidation does not seem to occur.

In practice the principal item of expense in activation is fuel and it is necessary to use flame gases as a source of heat. The present invention has for its object an economical and methodical use of fuel in a process of producing highly activated carbon based on the noted considerations. In this invention activation is in an atmosphere of superheated steam in the absence of $CO_2$ and at a temperature of 850° C. or as much higher as the apparatus will permit; say up to 1300° C. Products of combustion at flame temperature are used in heating the steam and the reacting zone and after losing heat enough to drop their temperature to about 800° C. or lower, are used in preheating the carbon to be steamed. At 800° C. or lower no injurious action on the carbon takes place.

In order to secure quick and efficient transfer of heat in a practical embodiment of the present process we treat the carbon as falling particles passing successively through two zones. In the one zone it is preheated by passing through and in contact with products of combustion at a temperature below the danger limit while in the other zone it similarly falls through an atmosphere of superheated steam. The superheated steam drops in temperature by its endothermic action on the carbon and the steam so cooled joins and mixes with the products of combustion used in the initial preheating.

In the accompanying illustrations we have shown, more or less diagrammatically, certain apparatus within our invention and capable of use in the performance of the described process. In this showing:

Fig. 1 is a vertical section of the complete apparatus;

Fig. 2 is an elevation of the apparatus;

Fig. 3 is a transverse section taken on line 3—3 of Fig. 1; and

Fig. 4 is a transverse section taken on line 4—4 of Fig. 1.

In the embodiment of our process used in the apparatus shown, finely divided carbon to be activated is first dropped through a tower in countercurrent to passing cooled products of combustion. In so doing particles are widely spaced from each other and effective transfer of heat is secured. In this operation we do not desire to go above 800° C. and generally not above 750° C. The particular temperature however depends somewhat upon the carbon. Ordinarily the vertical length through which the carbon particles are dropped is about 20 feet and the upwardly flowing products of combustion are sent through at such a velocity as not to wholly buoy up or suspend the particles of carbon. A gentle upward movement of the hot gases throughout the entire prism is desired and whirling or eddying actions are avoided as far as possible. What is desired is a retarded natural fall of the particles. The carbon particles dropping in retarded fall are gradually brought up to a temperature just below the activating temperature. No activating action by the $CO_2$ or the $H_2O$ of the products of combustion is here desired.

When the falling particles have attained a temperature somewhere between 750 and 800° C. (this varying with the particular carbon) the carbon is withdrawn from contact with the products of combustion and the carbon particles pass into a hotter region where there is no substantial amount of $CO_2$. Into this hotter region superheated steam passes upward as a gentle flow, there being a retarded fall as before. The necessary high temperature and ample supply of heat units in this activating zone are derived partly by heating through a heat conductive wall and in part by preheating of the introduced steam. In the showing of Fig. 1, reference character 10 designates the tower as a whole. As shown, it is composed of an outer steel shell 11 lined with heat resistant ceramic material such as brickwork courses 12 and 13. At the top the tower is closed and above the closure is feed hopper 14 having a plurality of downwardly extending feed pipes 16 passing through top 15. A number of angularly disposed exhaust pipes 17 serve to withdraw waste gases and fine dust without creation of eddies or currents. It will be noted that the inlet to each pipe 17 is located at a higher level than the outlets of pipes 16. This arrangement aids in avoiding eddy currents. The carbon at first falls through the chamber 18 which is cylindrical in its upper portion but is outwardly coned at the top and below line 19. Below, and in line with, upper chamber 18 is another chamber formed by cylindrical shell 22, advantageously formed of carborundum or other material highly resistant to heat and of good heat transmitting qualities. The upper end of 22 is within the outwardly coned lower end of 18. The diameter of shell 22 is pactically the same as that of the cylindrical chamber 18. Carbon falls from 18 directly into 22. Around the top of the shell 22 is an annular passage 23. Through this passage cooled products of combustion gain access to chamber 18. Around the shell 22 is an annular chamber 24 serving as a heating chamber and, in this embodiment of our invention, as a burning chamber. As illustrated, into this chamber enter a number of pipes 25. These pipes are arranged in a helix around the tower, or they may be otherwise arranged to heat evenly the lower part of the shell 22. Through these pipes are introduced air and combustible gas, such as producer gas or natural gas. As shown, the pipes 25 are in effect gas burners. Products of combustion at full flame temperature are produced in chamber 24 and heat the steam and carbon in the chamber of 22. The products of combustion cooled by this heating action join the steam and gases coming from the steam chamber 22 and pass upwardly through chamber 18. The burner pipes 25 are advantageously tangentially presented as shown in Fig. 3. This not only assists in completion of combustion but assures a small vertical velocity component in the gases passing through the annular opening 23 and entering chamber 18, thereby avoiding development of swirling actions.

Chamber 24 does not extend the full length of shell 22 which is seated in the foundation 26. Into this lower portion of the shell 22 steam is introduced by tangentially disposed pipes 27. The steam is advantageously preheated by means not shown. The pipes 28 and 29 shown are intended to enable use of observing instruments, manometers, pyrometers, etc. Below the end of shell 22 is a coned chamber 31 serving to collect the treated carbon and permit its removal.

It will be understood that numerous modifications in the specifically described embodiments of the invention may be made without departure from the principles thereof. For example, the activating gases used in the second stage of the process may consist not only of steam, but may include chlorin, sulfur dioxid, or other non-carbonaceous gases. The chamber 22 may be internally, as well as externally heated, by positioning within the chamber a burner shielded by a tube of heat resistant material such as carborundum or a nickel-chromium-steel alloy, so disposed as to permit of the flow of products of combustion from the burner into the upper chamber 18, rather than the lower chamber 22. Tangentially disposed vanes may also be disposed in the passage 23, in order to impart a whirling motion to the gases as they enter the lower segment or portion of the chamber 18. Various similar changes will occur to those skilled in the art without further discussion here.

What we claim is:—

1. In the activation of carbon, the process which comprises preheating carbon to a temperature approaching but not above 800° C. by contacting it with hot combustion gases containing $CO_2$, removing the preheated carbon from said contact and then heating the carbon to a higher temperature in an atmosphere of steam substantially free of $CO_2$.

2. In the activation of carbon, the process which comprises preheating carbon to a temperature below 850° C. in a non-flaming atmosphere containing products of combustion and afterwards further heating the preheated carbon to a temperature above 850° C. in an atmosphere of steam, said further heating being by flame gases out of contact with the preheated carbon and the preheating of the carbon being by direct contact with said flame gases.

3. In the activation of carbon, the process which comprises preheating carbon to a temperature not above 850° C. by cooled products of combustion, further heating the preheated carbon to a higher temperature in an atmosphere of steam by radiated heat from a hot conductive wall, heating said wall by high temperature products of combustion and thereby cooling said products and passing the cooled products of combustion into contact with carbon to supply preheating thereto.

4. In the activation of carbon, the process which comprises dropping dispersed particles of carbon in retarded fall downward through an upwardly moving column of products of combustion, thereby heating the carbon to a temperature not above 850° C., removing the carbon from said column and then continuing the fall of the dispersed carbon particles through an upward current of steam at a temperature sufficient to effect activation.

5. In apparatus for the activation of carbon, a vertical tower of less diameter in a top segment and of greater diameter in a bottom segment, an imperforate shell of heat conductive material within the portion of large diameter and spaced away from the walls, said shell being of an internal diameter corresponding to that of the top segment and having its upper edge somewhat below said upper segment to provide a channel, means for producing flame gases in the space between the shell and the walls of the bottom segment of the tower and means for introducing steam into the shell.

6. In apparatus for activating carbon a high cylindrical tower, means for feeding carbon to be activated into the upper portion of the tower, an open top shell of heat conducting material in the base of the tower and spaced away somewhat from its walls to form a flame chamber therebetween, said flame chamber communicating with the upper portion of the tower through a channel around the upper end of the shell, means for tangentially introducing flame jets into the flame chamber, means for removing products of combustion from the top of the tower, means for introducing steam into the shell and means for removing activated carbon from the tower.

7. The process of making activated carbon which comprises contacting carbonaceous material with hot gaseous products of combustion containing substantial quantities of $CO_2$, thereby producing a carbon preheated to a temperature not exceeding 800° C., removing said preheated carbon out of contact with said products of combustion and activating it by heating it to a temperature above 850° C. while subjecting it to the action of steam substantially free of $CO_2$.

8. In the manufacture of activated carbon the process which comprises heating preheated carbon to temperatures above 850° C. while subjecting said carbon to the action of steam substantially free of $CO_2$, supplying heat absorbed in said action by a combustion of carbonaceous fuel and supplying preheat to a further quantity of carbon by contacting it with the products of said combustion.

In witness whereof we have hereunto affixed our signatures.

RAYMOND G. DAVIS.
MARSHALL T. SANDERS.